United States Patent
Coast

(10) Patent No.: US 10,293,648 B2
(45) Date of Patent: *May 21, 2019

(54) AMPHIBIOUS MARSH CRAFT

(71) Applicant: John B. Coast, Baton Rouge, LA (US)

(72) Inventor: John B. Coast, Baton Rouge, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/943,056

(22) Filed: Apr. 2, 2018

(65) Prior Publication Data

US 2018/0290510 A1 Oct. 11, 2018

Related U.S. Application Data

(63) Continuation of application No. 15/494,928, filed on Apr. 24, 2017, now Pat. No. 9,931,899, which is a (Continued)

(51) Int. Cl.
*B60F 3/00* (2006.01)
*B62D 55/06* (2006.01)
(Continued)

(52) U.S. Cl.
CPC ............ *B60F 3/0015* (2013.01); *B60F 3/003* (2013.01); *B60F 3/0007* (2013.01); (Continued)

(58) Field of Classification Search
CPC .............................. B60F 3/0015; B60F 3/0007
See application file for complete search history.

(56) References Cited

U.S. PATENT DOCUMENTS 2,546,523 A * 3/1951 Reynolds .............. B60F 3/0015
180/9.23
3,385,255 A * 5/1968 Raymond ............. B60F 3/0007
180/9

(Continued)

*Primary Examiner* — Lars A Olson
*Assistant Examiner* — Jovon E Hayes
(74) *Attorney, Agent, or Firm* — Garvey, Smith & Nehrbass, Patent Attorneys, L.L.C.; Charles C. Garvey, Jr.; Vanessa M. D 'Souza

(57) ABSTRACT

A tracked, amphibious vehicle, comprising at least two, spaced, elongated pontoons disposed generally parallel to one another. A platform structure can be supported by and structurally connects the pontoons, the platform structure including a transom, a lowermost generally horizontally extending panel above a free clearance area under a bottom panel and between the pontoons through which terrain and debris can pass. A hydraulic drive system can propel the vehicle, said drive system including left and right hydraulic motors mounted on the pontoons. At least one series of longitudinally spaced bogie wheels for supporting said vehicle can be mounted along the bottom of the pontoons. A continuous, endless belt can encircle each pontoon and engages the bogie wheels. Ground-engaging cleats assembled on the outer surface of each belt and covering the pontoon bottom provide traction to the vehicle. Gearing interfaces the motor with the endless belts. A supplemental, marine drive assembly includes: a hydraulic motor having a rotary device, shaft, with an axis, a propeller shaft having an axis wherein the motor axis and propeller axis are aligned, a universal joint connecting the hydraulic motor to the transom, and a housing including a sleeve that contains the propeller shaft, a first vertical plate connected to the sleeve and a second vertical plate connected to the sleeve below the first plate.

25 Claims, 17 Drawing Sheets

Related U.S. Application Data continuation of application No. 14/859,822, filed on Sep. 21, 2015, now Pat. No. 9,630,465.

(60) Provisional application No. 62/052,543, filed on Sep. 19, 2014.

(51) Int. Cl.
*B62D 55/18* (2006.01)
*B63H 1/34* (2006.01)
*B63H 25/42* (2006.01)
*B63H 1/12* (2006.01)
*B63C 13/00* (2006.01)

(52) U.S. Cl.
CPC ............ *B60F 3/0038* (2013.01); *B62D 55/06* (2013.01); *B62D 55/18* (2013.01); *B63H 1/34* (2013.01); *B63C 13/00* (2013.01); *B63H 25/42* (2013.01); *B63H 2001/122* (2013.01); *B63H 2001/342* (2013.01); *B63H 2001/344* (2013.01)

(56) References Cited

U.S. PATENT DOCUMENTS

| | | | | |
|---|---|---|---|---|
| 4,433,634 A | * | 2/1984 | Coast | B60F 3/0061 180/9.1 |
| 4,673,370 A | * | 6/1987 | Goldfarb | A63H 29/22 446/160 |
| 4,961,395 A | * | 10/1990 | Coast | B60F 3/0015 305/137 |
| 5,899,164 A | * | 5/1999 | Coast | B60F 3/0015 305/127 |
| 5,984,032 A | * | 11/1999 | Gremillion | B62D 55/0655 180/14.1 |
| 6,203,124 B1 | * | 3/2001 | Meyer | B62D 55/14 305/136 |
| 6,234,260 B1 | | 5/2001 | Coast et al. | |
| 6,305,882 B1 | | 10/2001 | Coast et al. | |
| 6,315,622 B1 | * | 11/2001 | Wilson, Sr. | B60F 3/003 180/9.62 |
| 6,921,304 B2 | * | 7/2005 | Hewitt | B60F 3/0015 305/120 |
| 7,552,785 B2 | * | 6/2009 | Tuhy | B60G 5/01 180/9.5 |
| 7,670,200 B2 | * | 3/2010 | Wilson | B60F 3/0015 440/12.5 |
| 8,721,378 B2 | * | 5/2014 | Da Silva | B63B 35/68 305/101 |
| 9,162,545 B1 | * | 10/2015 | Wilson | B60F 3/0015 |
| 9,260,145 B2 | * | 2/2016 | Korus | B62D 55/04 |
| 9,630,465 B2 | | 4/2017 | Coast | |
| 9,931,899 B2 | | 4/2018 | Coast | |
| 2005/0003715 A1 | * | 1/2005 | Hewitt | B60F 3/0015 440/12.5 |
| 2010/0062664 A1 | * | 3/2010 | Hewitt | B60F 3/0007 440/12.52 |
| 2016/0082798 A1 | * | 3/2016 | Coast | B60F 3/0015 440/12.56 |

* cited by examiner

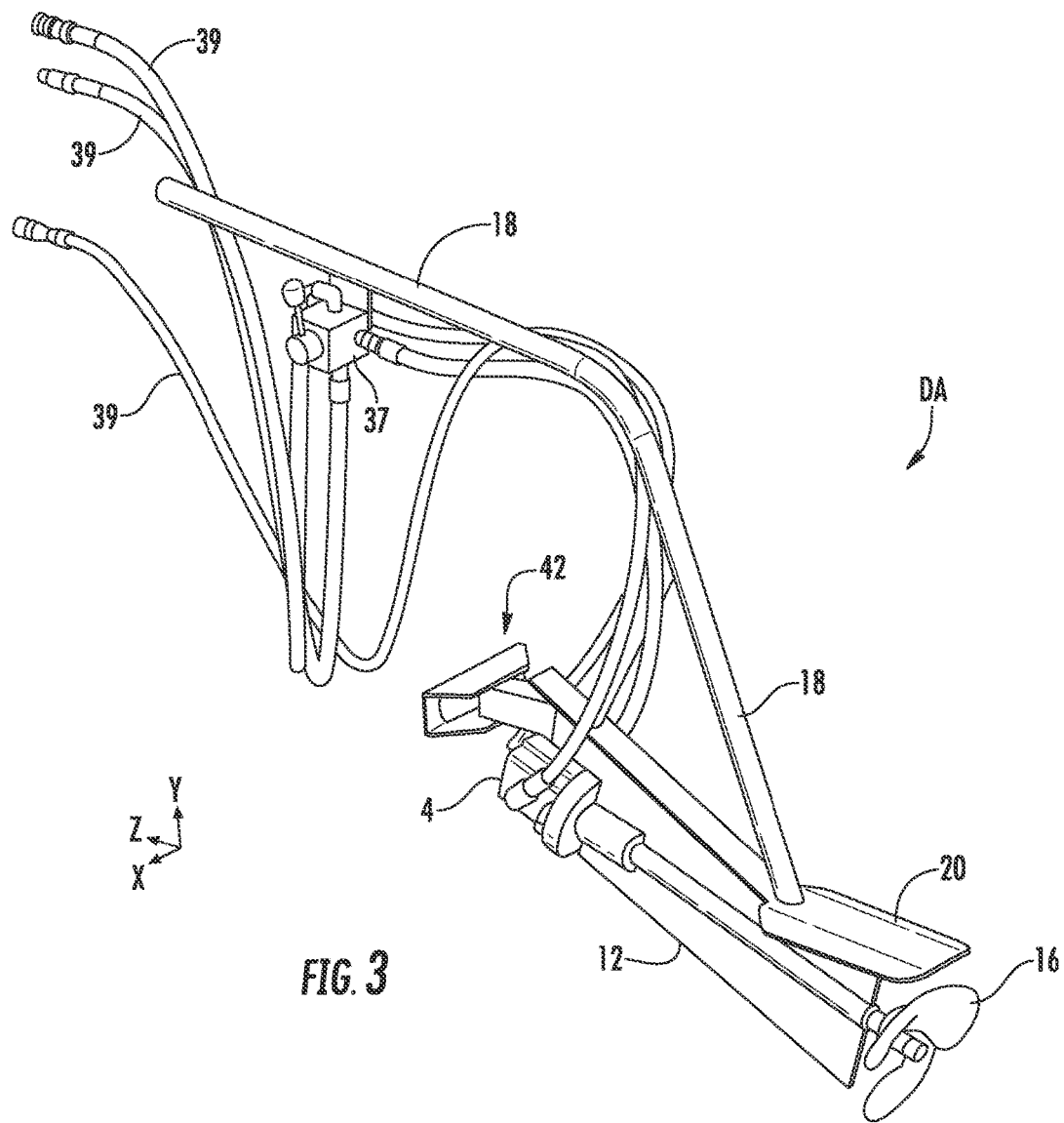

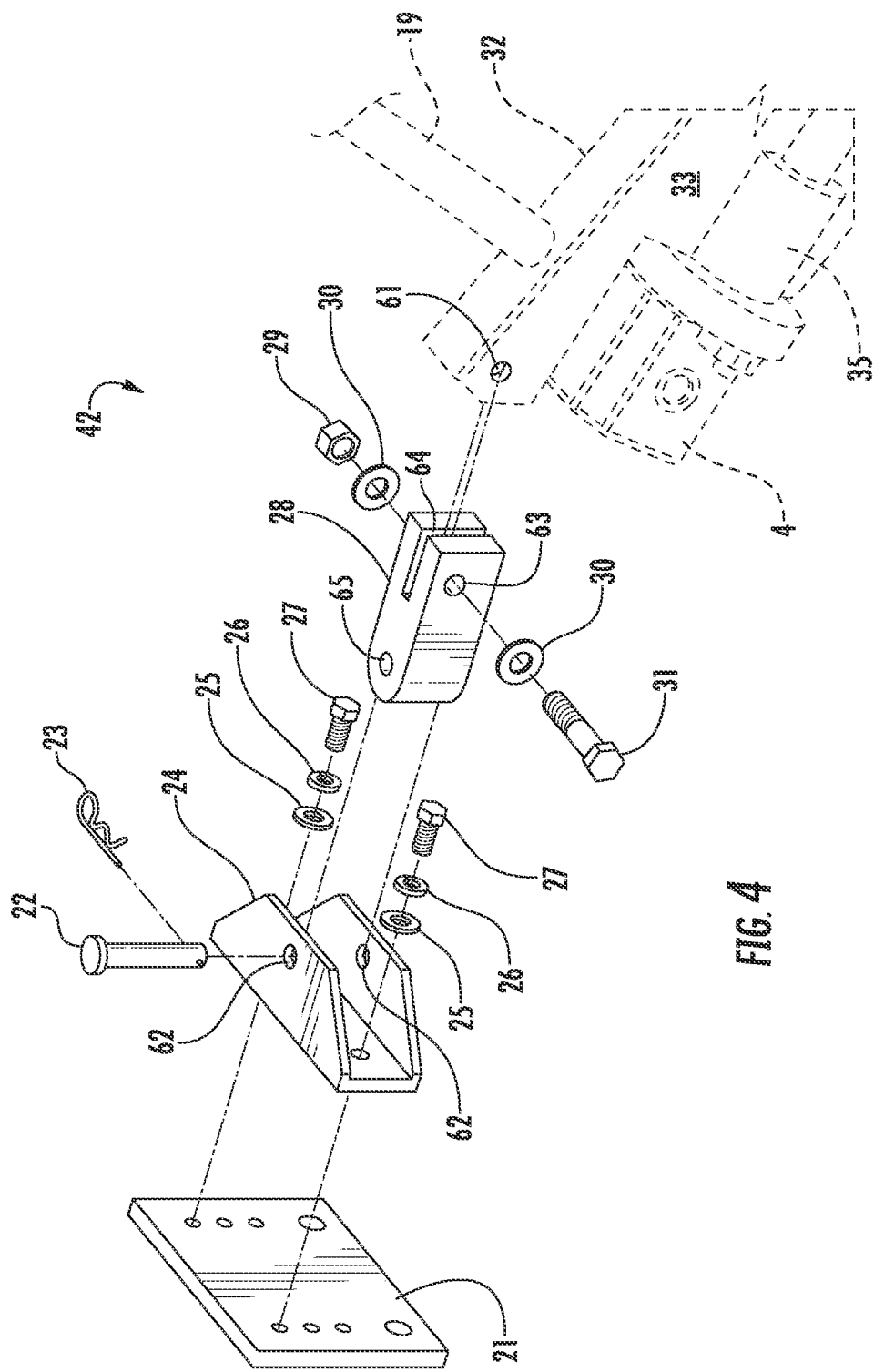

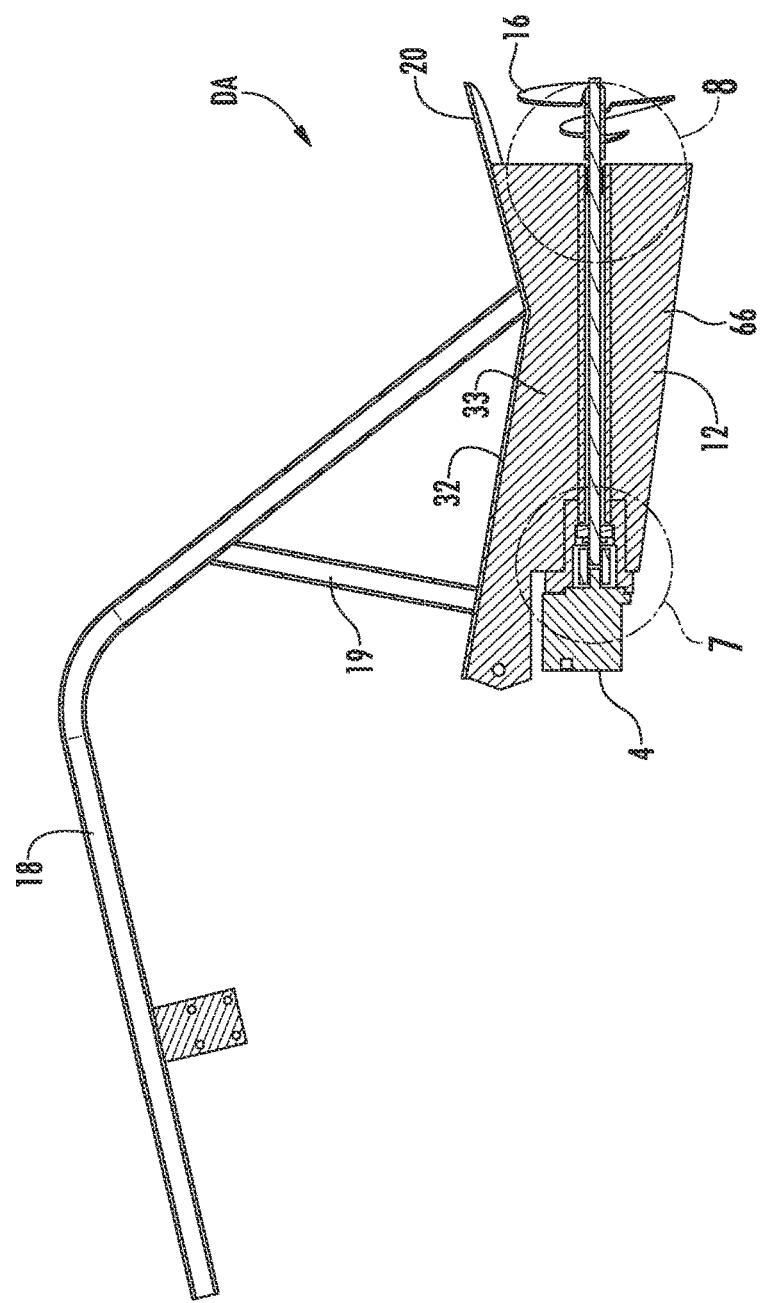
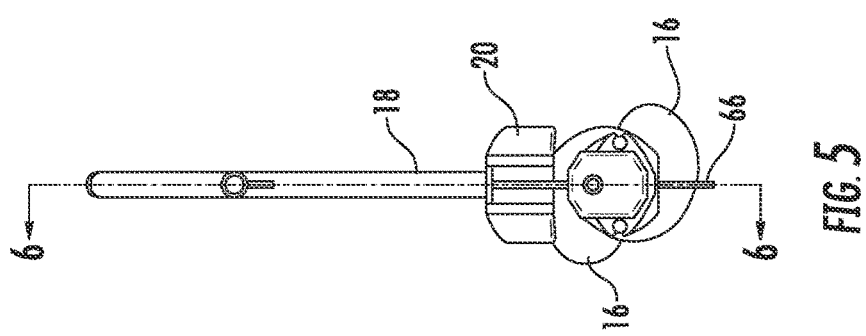

AMPHIBIOUS MARSH CRAFT

CROSS-REFERENCE TO RELATED APPLICATIONS

This is a continuation of U.S. patent application Ser. No. 15/494,928, filed 24 Apr. 2017 (issued as U.S. Pat. No. 9,931,899 on 3 Apr. 2018), which is a continuation of U.S. patent application Ser. No. 14/859,822, filed 21 Sep. 2015 (issued as U.S. Pat. No. 9,630,465 on 25 Apr. 2017), which claims benefit of U.S. Provisional Patent Application Ser. No. 62/052,543, filed 19 Sep. 2014, which is hereby incorporated herein by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to amphibious tracked craft having a frame connecting two spaced apart pontoons, a transom and an improved supplemental drive system that employs a hydraulically driven propeller, a universal joint connection to the transom, a hydraulic motor with in line drive and improved tilt and steerage.

2. General Background of the Invention

Amphibious marsh craft can be seen in the following US patents issued to John B. Coast, each of which is hereby incorporated herein by reference: U.S. Pat. Nos. 4,433,634; 4,961,395; 5,899,164; 6,234,260 and 6,305,882. In the past, such amphibious craft propel themselves across streams, lakes or other water bodies by simply running their tracks. Such craft have limited swimming capability using the tracks to propel in the water. Lightly loaded machines that float high in the water (e.g., with the centerline of the rear drive sprockets above the waterline) are capable of "swimming" at low speeds (e.g., approximately 2 mph). This capability allows these amphibious machines to cross canals, rivers, creeks, bayous, lakes, bays, etc., provided that wind and currents are low. One of the utilities of such amphibious craft is to carry heavy equipment such as seismic equipment or auger installing equipment. When the load on the machines increases, the rear of the machine and the rear sprocket centerline can dip below the waterline. The swimming capability with tracks only propelling then decreases to near zero.

In the prior art, some amphibious craft have provided a transom on the rear designed to accept an outboard motor. Outboards up to 40 horsepower (hp) have been used to propel these amphibious machines at speeds of over 3 mph. Outboard motors have thus given such machines good propulsion and maneuverability. However, this capability is rarely used because operators typically do not want to bother with handling the outboard motors and/or the gasoline tanks or fuel tanks required. Outboard motors are typically heavy four stroke units weighing two hundred pounds ore more (e.g., 40 horsepower Honda outboard weighs 214 pounds).

BRIEF SUMMARY OF THE INVENTION

The present invention provides an in line hydraulic drive unit of improved configuration which can easily be attached to the rear of an amphibious marsh craft as needed and be removed very easily if not in use.

Various embodiments preferably provide a tracked, amphibious vehicle, comprising at least two, spaced, elongated pontoons disposed generally parallel to one another. A platform structure is preferably supported by and may structurally connect the pontoons, the platform structure preferably including a transom, a lowermost generally horizontally extending panel above a free clearance area under a bottom panel and between the pontoons through which terrain and debris can pass. A hydraulic drive system may propel the vehicle, said drive system including left and right hydraulic motors mounted on the pontoons, the left motor mounted on a left pontoon, the right motor mounted on a right pontoon. At least one series of longitudinally spaced bogie wheels are preferably provided for supporting said vehicle mounted along the bottom of each of said pontoons. A continuous, endless belt preferably encircles each pontoon and engages the bogie wheels and ground-engaging cleats assembled on the outer surface of each belt and preferably covering the pontoon bottom for providing traction to the vehicle.

In various embodiments, each of the hydraulic motors can have gearing that interfaces the motor with the endless belts.

In various embodiments, a supplemental, marine drive assembly can be provided that includes:
   a hydraulic motor having a rotary device, shaft, with an axis;
   a propeller shaft having an axis;
   wherein the motor axis and propeller axis are preferably aligned;
   a universal joint that preferably connects the hydraulic motor to the transom;
   wherein the universal joint preferably includes an attachment that is on the transom and above the said horizontally extending panel;
   a housing preferably including a sleeve that contains the propeller shaft, a first plate preferably connected to the sleeve and a second plate preferably connected to the sleeve below the first plate.

In various embodiments, the first and second plates can be vertical.

In various embodiments, the first and second plates preferably define a plane.

In various embodiments, the propeller can be movable between a lower position below said horizontally extending panel and an upper position above said horizontally extending panel.

In various embodiments, said sleeve can be movable between a lower position below said horizontally extending panel and an upper position above said horizontally extending panel.

In various embodiments, a horizontal plate can be attached to said first plate.

In various embodiments, a cavitation plate can be attached to the first plate and the horizontal plate.

In various embodiments, an arm is preferably connected to the housing at the horizontal plate.

In various embodiments, an arm are preferably connected to the housing at the horizontal plate and the arm attaches to the horizontal plate at a first position and to the housing at a second position that is behind the first position.

In various embodiments, an actuator can be provided that lifts and lowers the propeller and sleeve.

In various embodiments, an actuator can be provided that pivots the sleeve and propeller between port and starboard positions.

In various embodiments, the first and second plates preferably define a plane.

In various embodiments, the propeller can movable between a lower position and an upper position above the lower position panel.

In various embodiments, the invention can further comprise a horizontal plate attached to the first plate.

In various embodiments, the invention can further comprise a cavitation plate attached to the first plate and the horizontal plate.

In various embodiments, the arm can attach to the horizontal plate at a first position and to the housing at a second position that is behind the first position.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 3 is a partial perspective view of a preferred embodiment of the apparatus of the present invention;

FIG. 4 is a partial perspective exploded view of a preferred embodiment of the apparatus of the present invention;

FIG. 5 is a partial elevation end view of a preferred embodiment of the apparatus of the present invention;

FIG. 6 is a sectional view taken along lines 6-6 of FIG. 5;

DETAILED DESCRIPTION OF THE INVENTION

Figure 1:
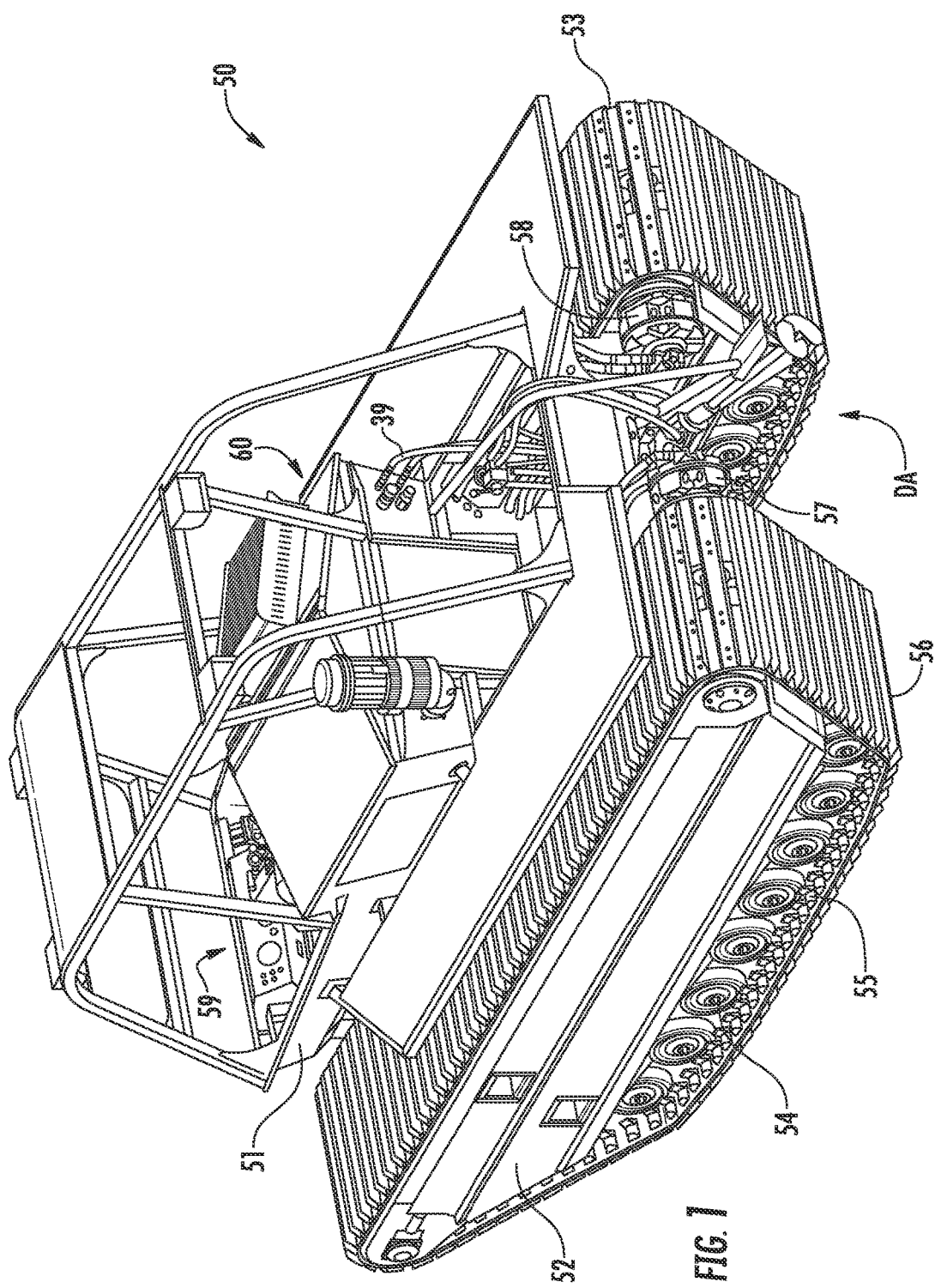
FIG. 1 is a perspective view of a preferred embodiment of the apparatus of the present invention.
Figure 2:
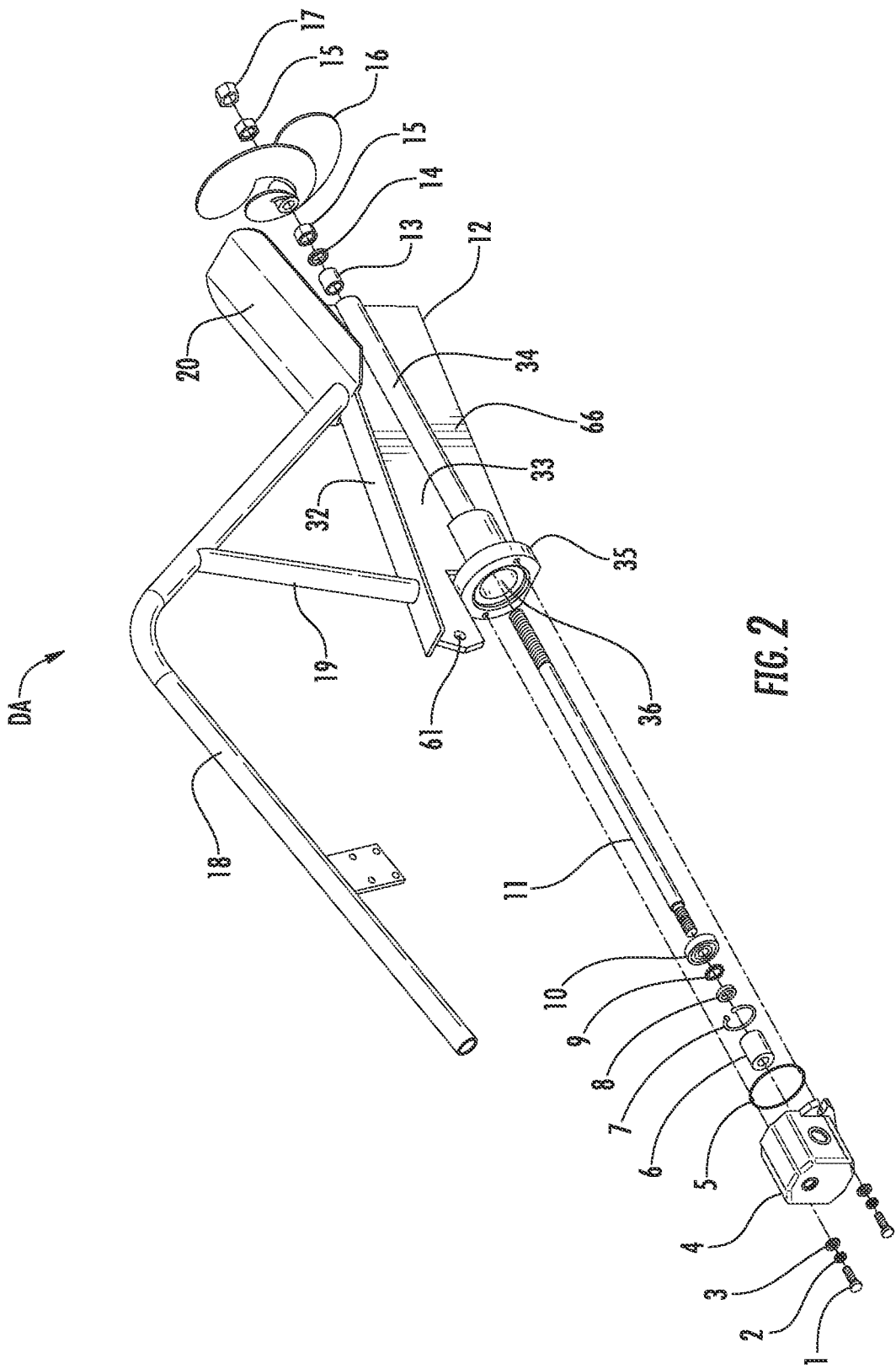
FIG. 2 is a partial perspective exploded view of a preferred embodiment of the apparatus of the present invention.
Figure 15:
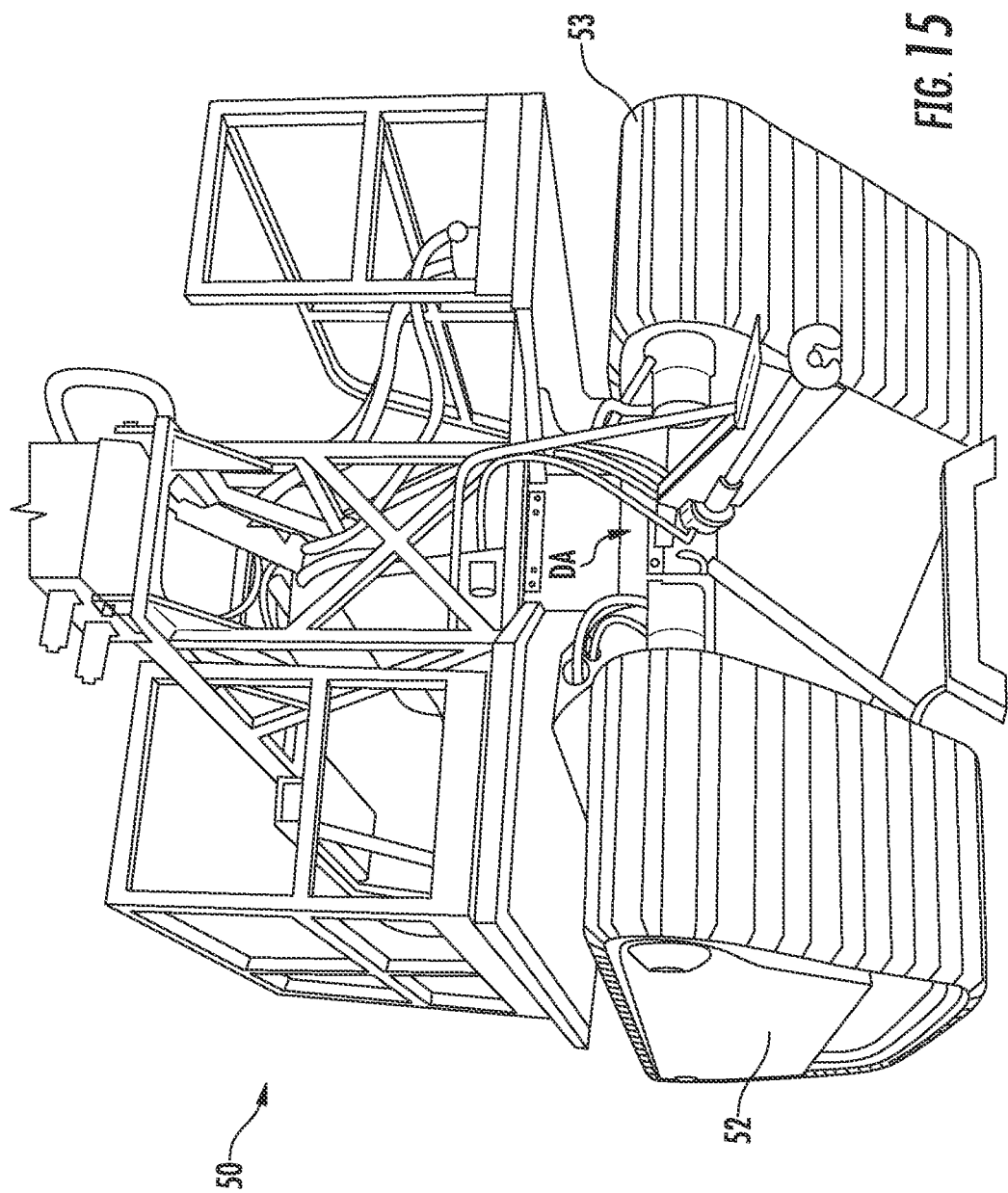
FIG. 15 is a perspective view of a preferred embodiment of the apparatus of the present invention.
Figure 16:
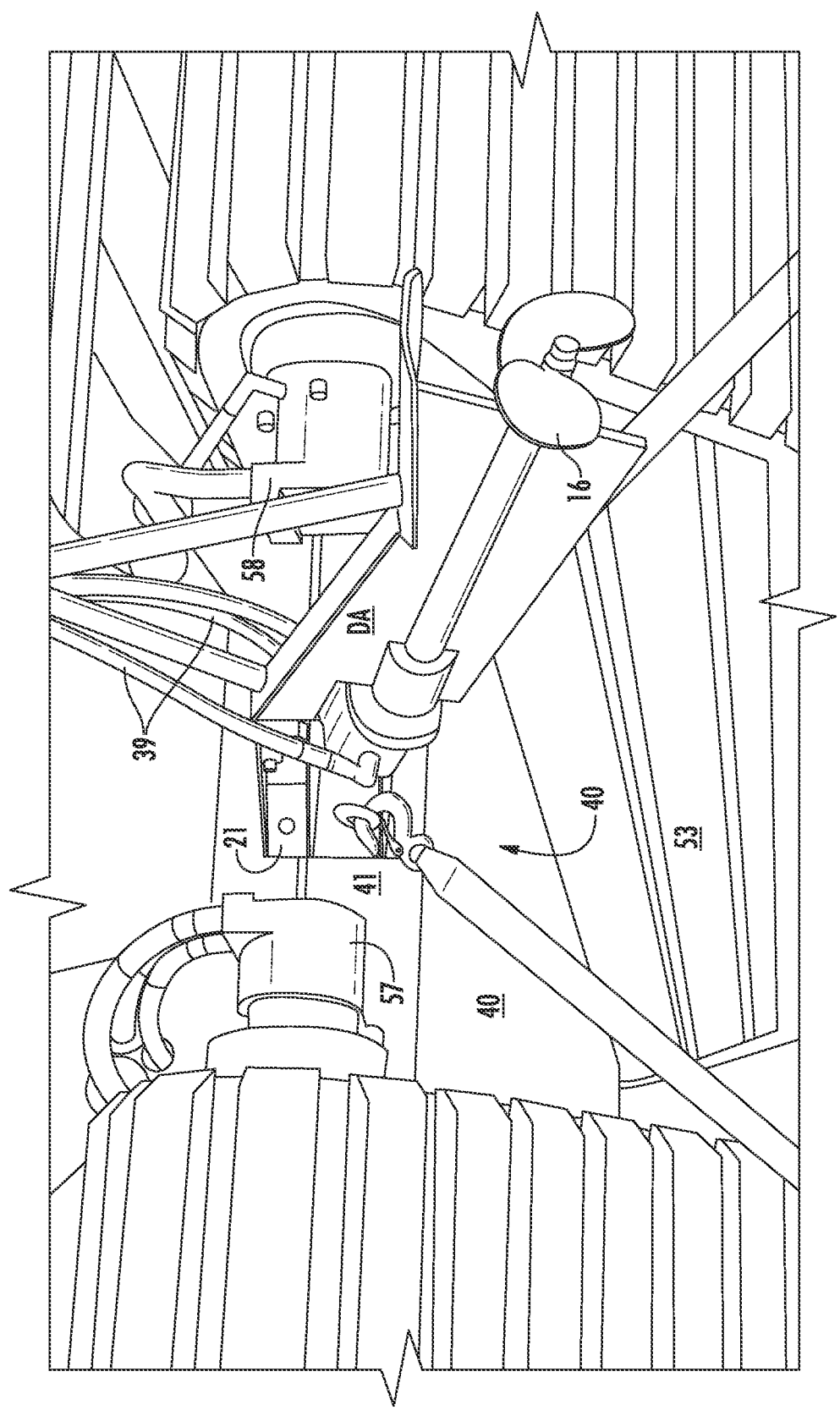
FIG. 16 is a partial perspective view of a preferred embodiment of the apparatus of the present invention.
Figure 17:
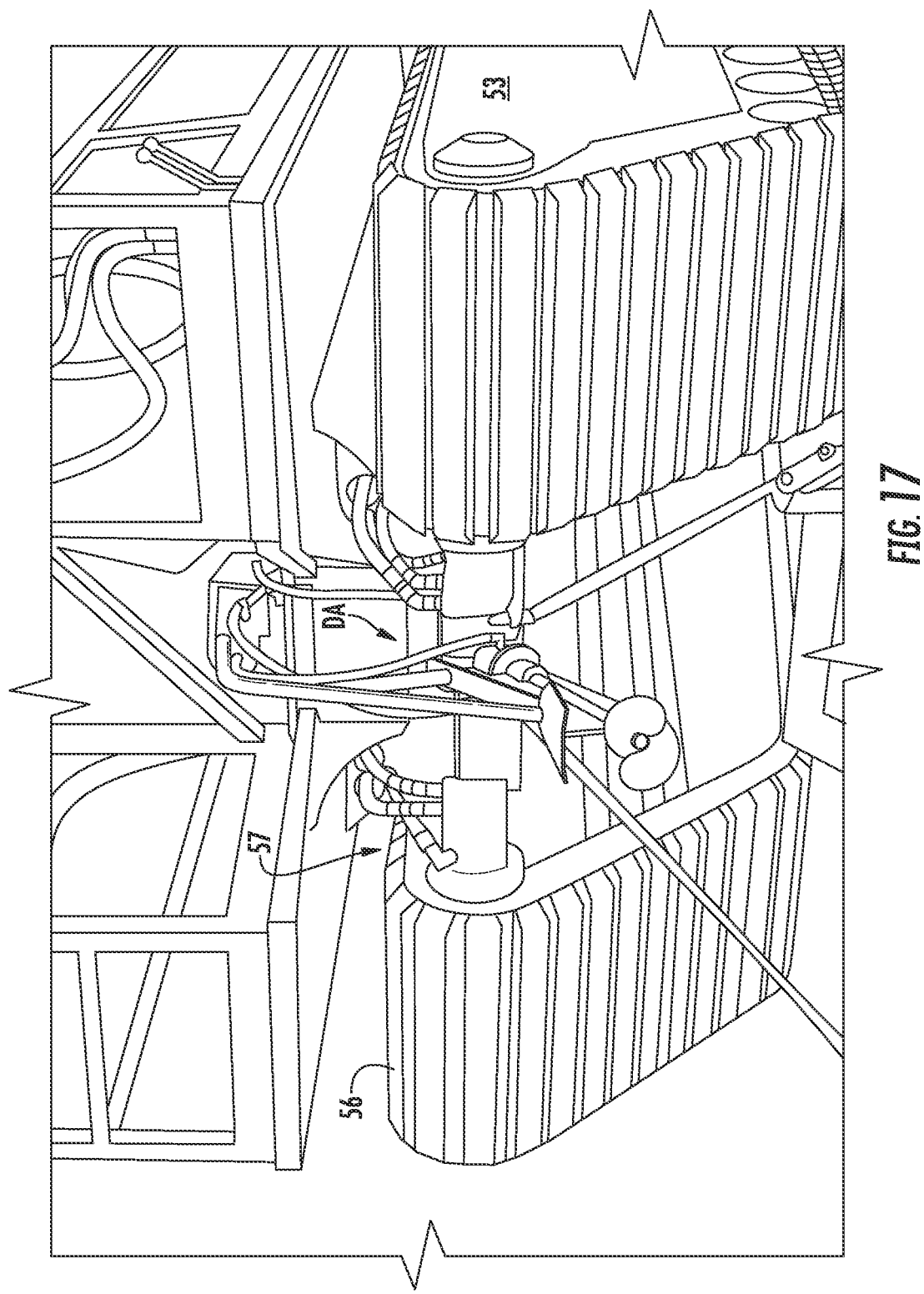
FIG. 17 is a partial perspective view of a preferred embodiment of the apparatus of the present invention.

FIGS. 1-13 and 15-17 show a preferred embodiment of the apparatus of the present invention designated generally by the numeral 50 in FIGS. 1 and 15. Amphibious tractor vehicle 50 provides a frame/platform structure 51 that is preferably connected to a pair of spaced apart pontoons 52, 53. The pontoons include port side pontoon 52 and starboard side pontoon 53 (see FIGS. 1, 15-17). Each pontoon preferably carries a plurality of bogie wheels 54. Endless tracks or tracks 55 preferably encircle each pontoon and engage the bogie wheels 54. The tracks 55 carry a plurality of cleats 56. The port side pontoon 52 preferably has port hydraulic motor drive 57. The starboard pontoon 53 preferably has starboard hydraulic motor drive 58. Each motor drive 57, 58 can be a direct drive motor that connects to the endless tracks 55 (e.g., via a drive shaft) for driving it around pontoon 52 or 53. In general, tracked amphibious vehicles having port and starboard pontoons tracks and hydraulic drive motors are known, as seen for example in U.S. Pat. Nos.: 4,433,634; 4,961,395; 5,899,164; 6,234,260; and 6,305,882, each said patent hereby incorporated herein by reference.

In FIG. 1, amphibious track vehicle 50 preferably provides a cabin or control station 59 and a hydraulic power unit 60. Hydraulic power unit 60 can include an engine such as a diesel engine and one or more hydraulic pumps.

Figure 9:
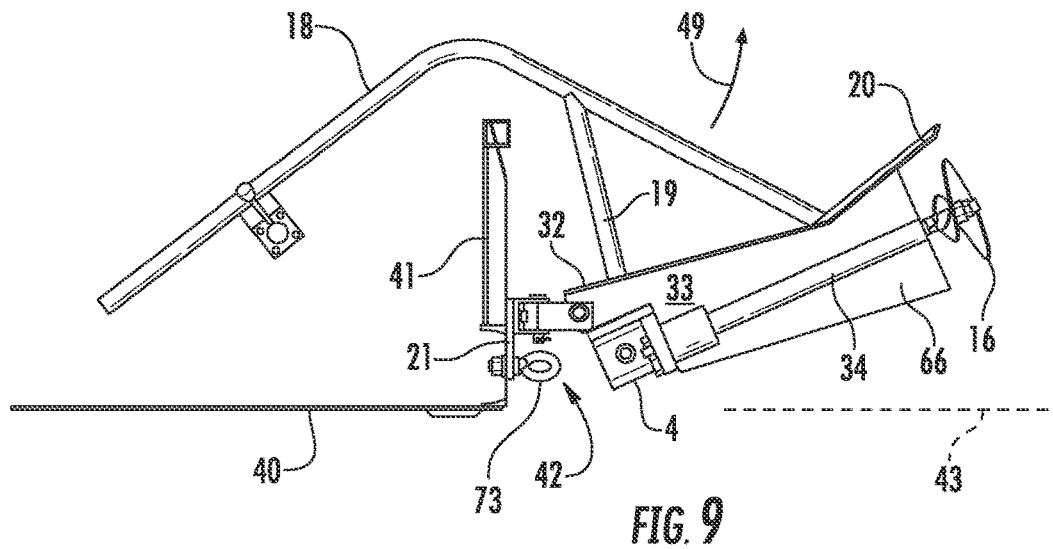
FIG. 9 is a schematic side elevation view of a preferred embodiment of the apparatus of the present invention illustrating the propeller in the uppermost position.
Figure 10:
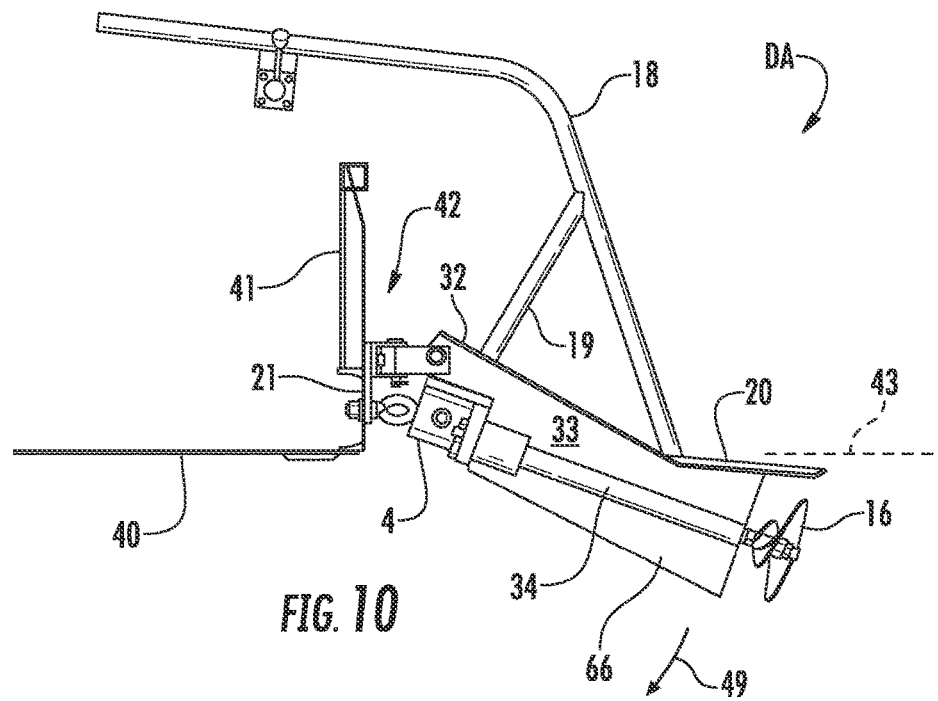
FIG. 10 is a schematic side elevation view of a preferred embodiment of the apparatus of the present invention illustrating the propeller in the lowermost position.

A drive assembly DA is seen in FIGS. 1-13. The drive assembly DA can be seen in more detail in FIGS. 2-13. In FIGS. 9 and 10, the frame/platform structure 51 of amphibious tractor vehicle 50 preferably includes an underside or bottom panel 40 with a horizontal surface which is the lowest part of the frame/platform structure 51 in between the pontoons 52, 53. in FIGS. 9 and 10, reference line 43 is an extension of the horizontal surface of bottom panel 40 of frame/platform structure 51. Notice in FIG. 10 that propeller 16 is positioned below reference line 43 and bottom panel 40 in a driving position. FIG. 9 illustrates an elevated position of propeller 16 wherein it is above reference line 43 and bottom panel 40.

Drive assembly DA preferably attaches to transom 41 above reference line 43 as seen in FIGS. 9 and 10. It should be understood that the attachment of drive assembly DA to transom 41 can be by universal joint 42 which is preferably below each of the hydraulic motor drives 57, 58 (see FIGS. 1, 9-10, 16-17). The attachment at universal joint 42 is preferably above bottom panel 40 and reference line 43, not subjected to debris or obstructions such as logs or stumps that might travel in between pontoons 52, 53 and below bottom panel 40. Arrows 49 illustrate movement of drive assembly DA propeller 16 between upper (FIG. 9) and lower (FIG. 10) positions.

Figure 7:
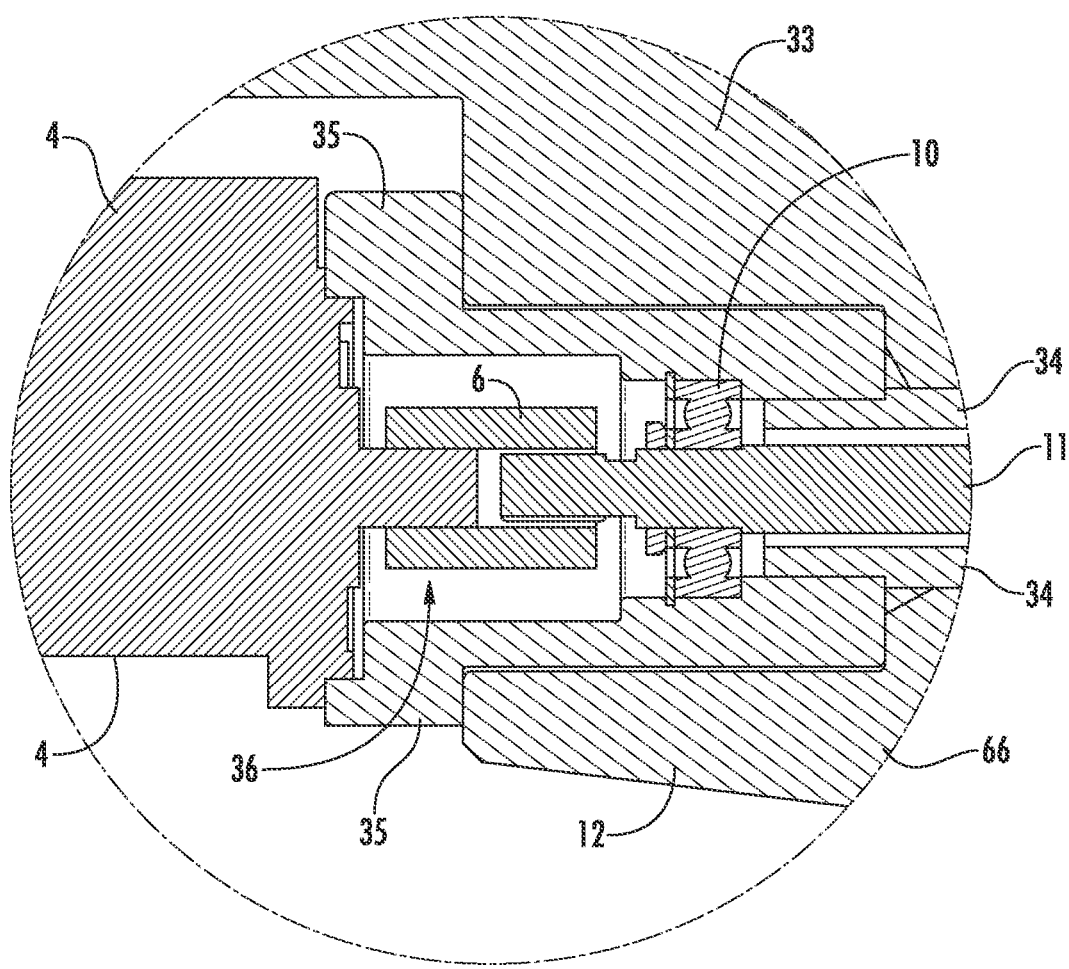
FIG. 7 is a detailed view of a preferred embodiment of the apparatus of the present invention taken from detail 7 of FIG. 6.
Figure 8:
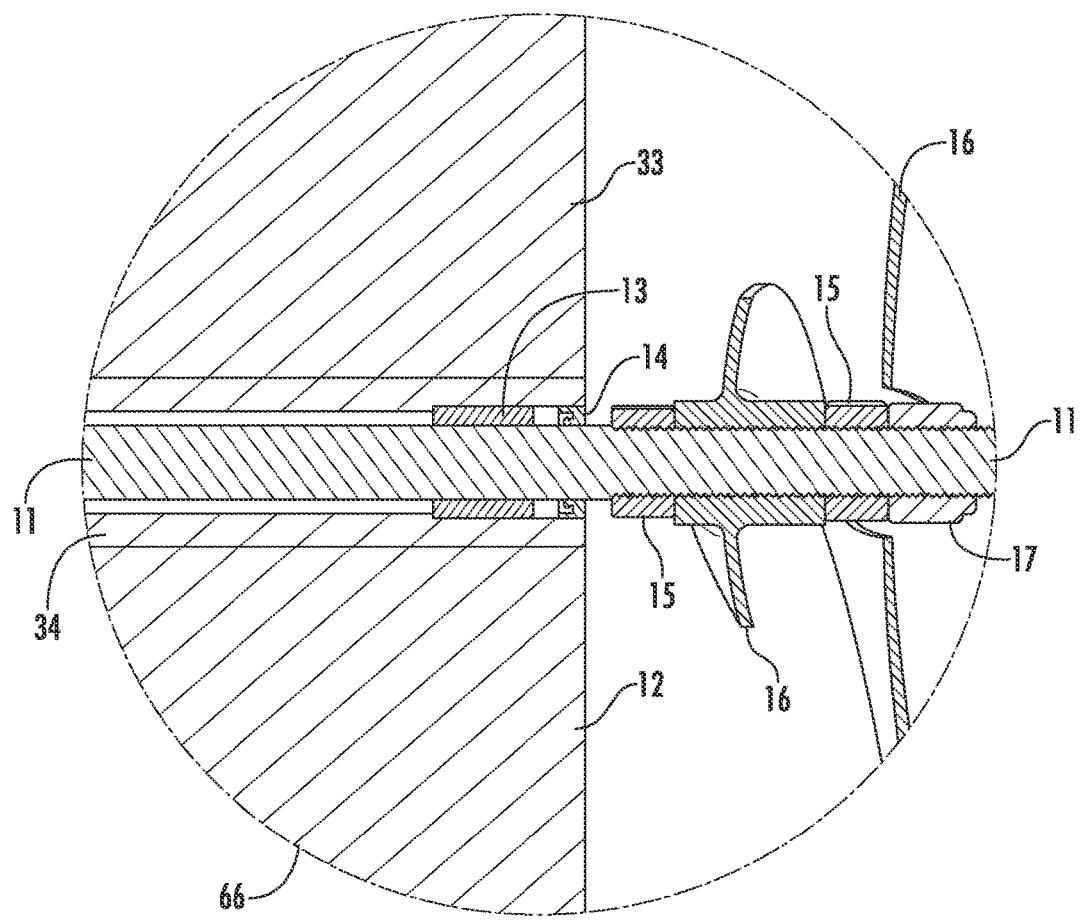
FIG. 8 is a fragmentary detail view of a preferred embodiment of the apparatus of the present invention taken from detail 8 of FIG. 6.

Drive assembly DA in FIGS. 2, 5-8 preferably includes a sleeve 34 that houses prop drive shaft 11. Prop drive shaft 11 connects to hydraulic motor 4 with splined bushing 6, as seen in FIG. 7. Other components that interface motor 4 to shaft 11 are motor mount 35 with interior or cavity 36, hex bolts 1, lock washers 2, flat washers 3, O-ring 5, snap ring 7, nut 8, lock washer 9 and ball bearing 10. Prop drive shaft 11 also connects to propeller 16, as seen in FIG. 8. Prop drive shaft 11 occupies sleeve 34 and extends to propeller 16 forming a connection therewith. Prop drive housing weldment 12 (which can include upper skeg 33 and lower skeg 66) is also shown in FIGS. 6-8. The skegs 33,66 interface with sleeve 34 and motor mount 35. The weldment or assembly 12 (see FIG. 2) of sleeve 34, skegs 33,66, horizontal plate 32, plate 20 and motor mount 35 can be of welded steel or welded aluminum construction or it can be a casting. Other components that form the connection between shaft 11 and propeller 16 include plain bearing 13, shaft seal 14, nuts 15 and nut 17 (see FIG. 8).

In FIGS. 2-13, drive assembly DA can provide arm 18 and strut 19. Arm 18 preferably connects to cavitation plate 20. Strut 19 preferably connects to plate 32 which can be welded to vertical plate or weldment 33. FIGS. 3-4 and 9-13 illustrate in more detail the universal joint or attachment 42 that preferably connects between plate 33 at opening 61 and transom 41. Pivot mount plate 21 attaches to transom 41. Prop drive pivot channel 24 attaches to plate 21. Bolted connections including hex bolt 27, lock washers 26 and flat washers 25 can be used to affix pivot channel 24 to plate 21. Prop drive pivot pin 22 forms a connection between prop drive pivot channel 24 and pivot block 28, through openings 62 of pivot channel 24 and opening 65 of pivot block 28. A bolted connection can be used to bolt pivot block 28 to plate 33. In FIG. 4, that bolted connection includes hex bolt 31, flat washers 30 and nut 29. A pin (e.g., hairpin) can be provided at 23 for retaining pivot pin 22 in openings 62 of channel 24. Openings 63 and pivot block 28 are receptive of the bolted connection that includes bolt 31, washers 30 and nut 29. A slot 64 in pivot block 28 is receptive of plate 33. During assembly, the openings 61, 63 are aligned when plate 33 is placed into slot 64.

Figure 11:
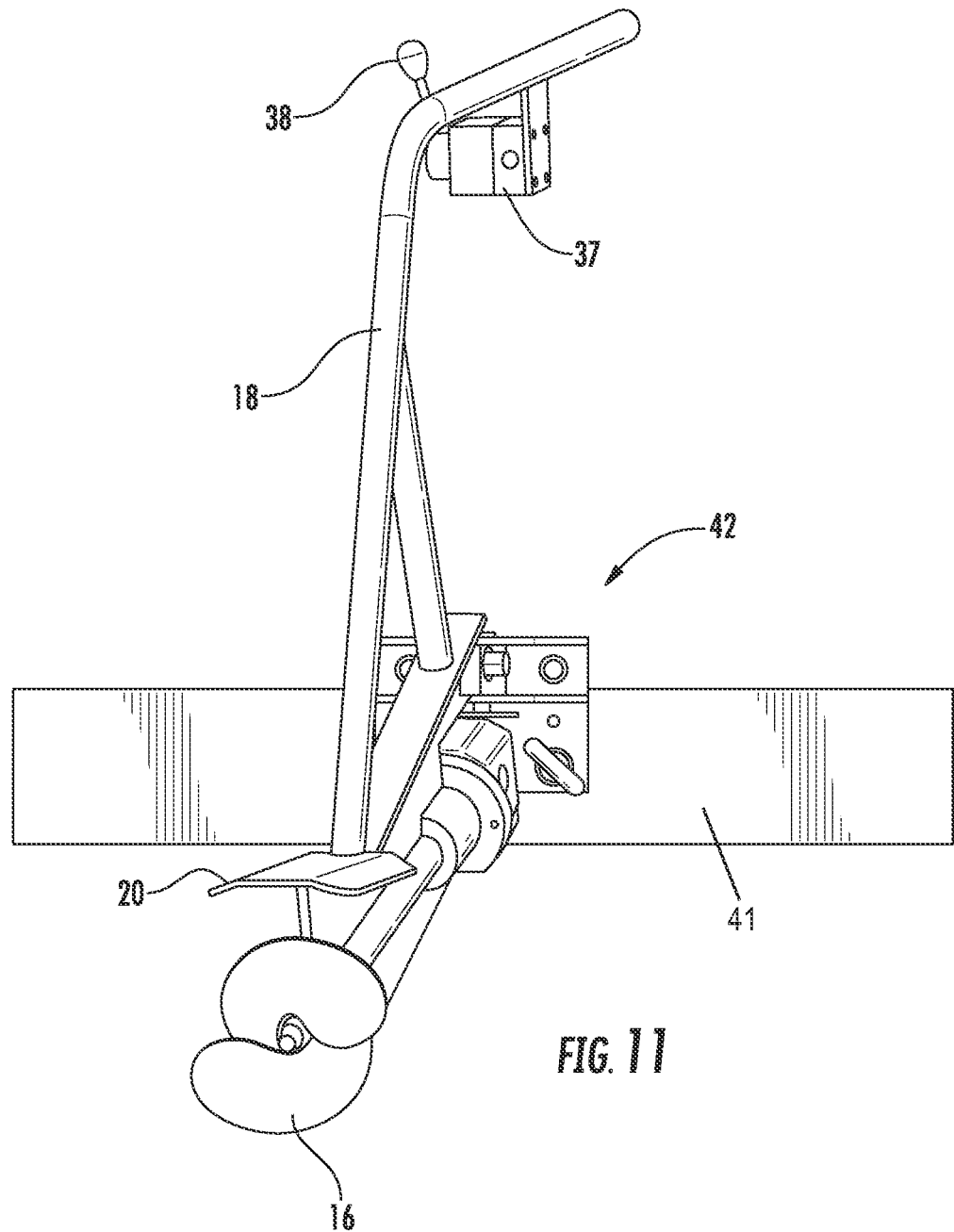
FIG. 11 is a schematic elevation end view of a preferred embodiment of the apparatus of the present invention illustrating the propeller in a down-left position.
Figure 12:
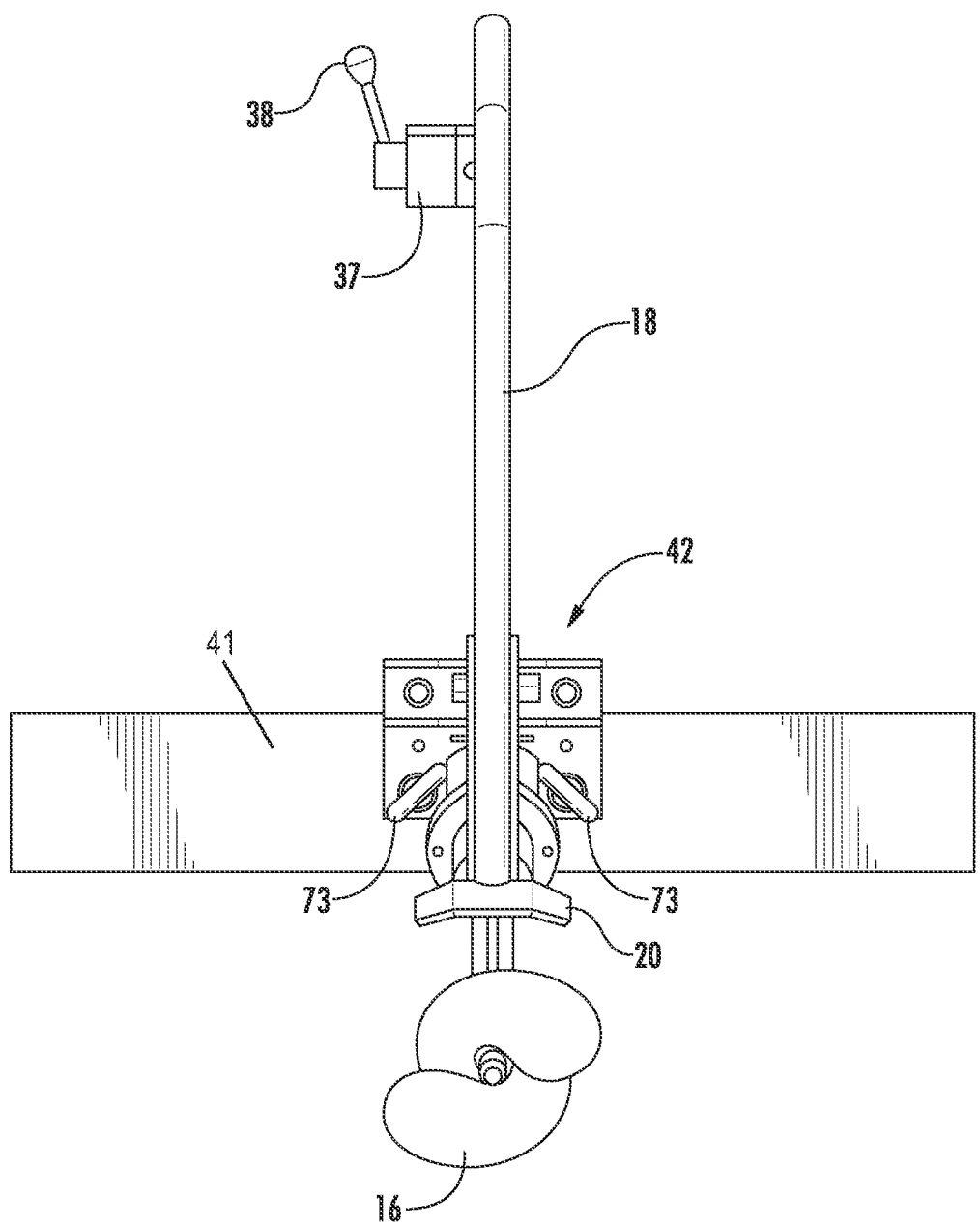
FIG. 12 is a schematic elevation end view of a preferred embodiment of the apparatus of the present invention illustrating the propeller in a down-center position.
Figure 13:
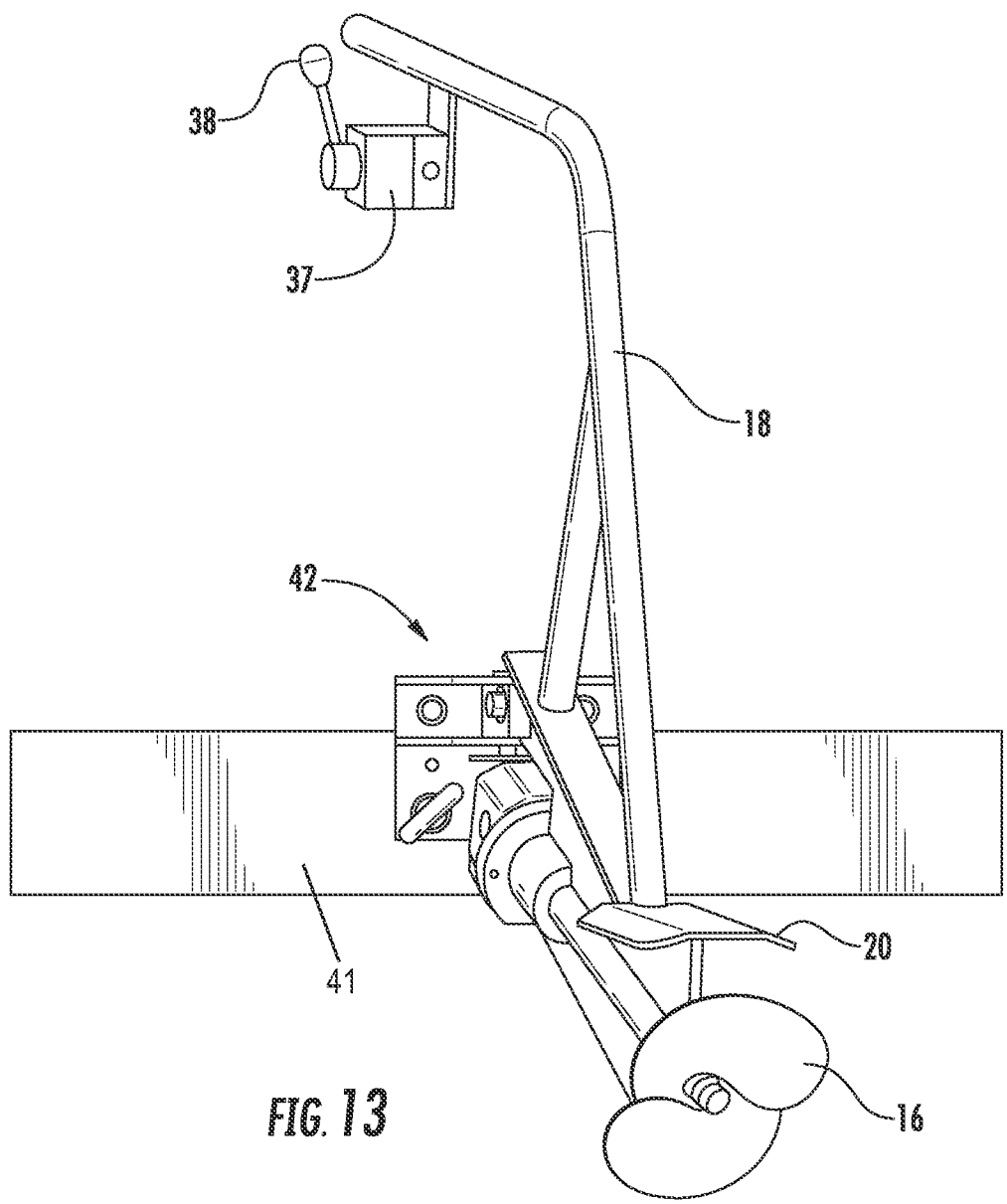
FIG. 13 is a schematic elevation end view of a preferred embodiment of the apparatus of the present invention illustrating the propeller in a down-right position.

In FIGS. 11-13, control valve 37 can be mounted on arm 18. The control valve 37 can include an actuator 38 that can be moved between forward and backward positions as well as a neutral position. In FIG. 3, drive assembly DA provides one or more hydraulic hoses 39 that interface between motor 4 and control valve 37. Hoses 39 also form an interface with the hydraulic power unit 60.

Figure 14:
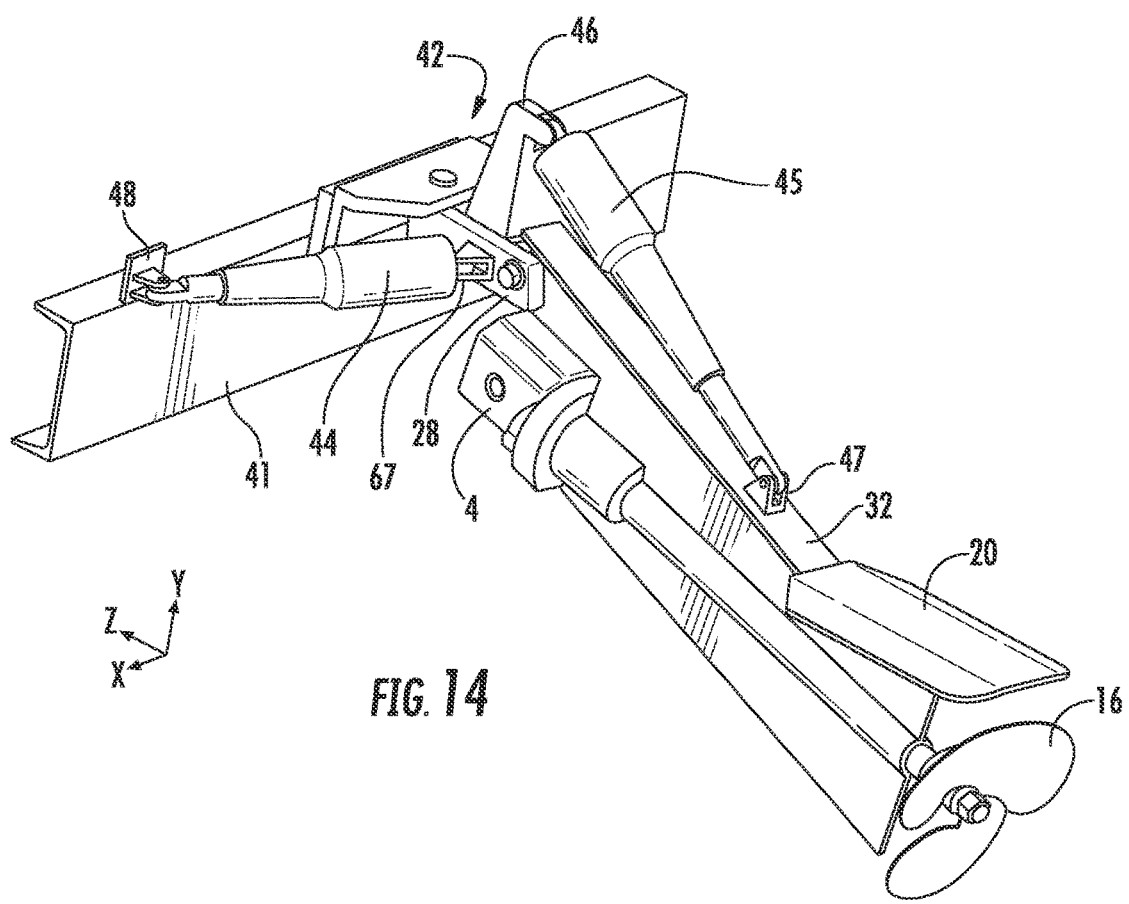
FIG. 14 is a perspective view of an alternate embodiment of the apparatus of the present invention.

FIG. 14 shows an alternate embodiment that employs actuators 44, 45. The actuator 44 can be an electric actuator to control left or right steerage. The actuator 45 can be an electric actuator to raise and lower drive assembly DA and propeller 16. Support 46 can be provided, extending upwardly from pivot block 28. Attachment 47 on plate 32 preferably provides an attachment for one end portion of actuator 45. The other end of actuator 45 preferably attaches to support 46. Similarly, the actuator 44 preferably affixes to transom 41 at attachment 48 and to pivot block 28 at its opposing end portion at attachment 67.

Figure 18:
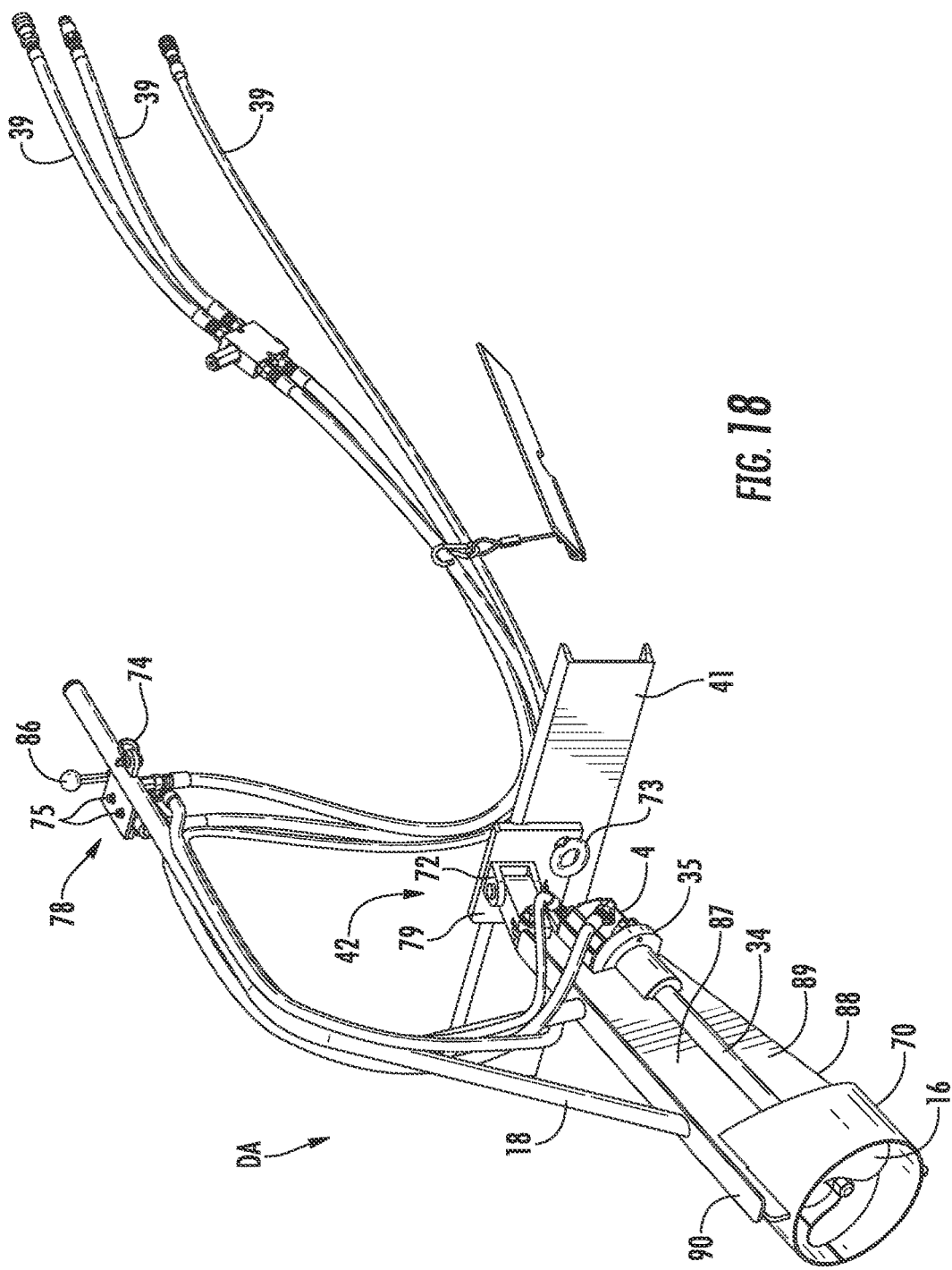
FIG. 18 is partial perspective view of an alternate embodiment of the apparatus of the present invention.
Figure 19:
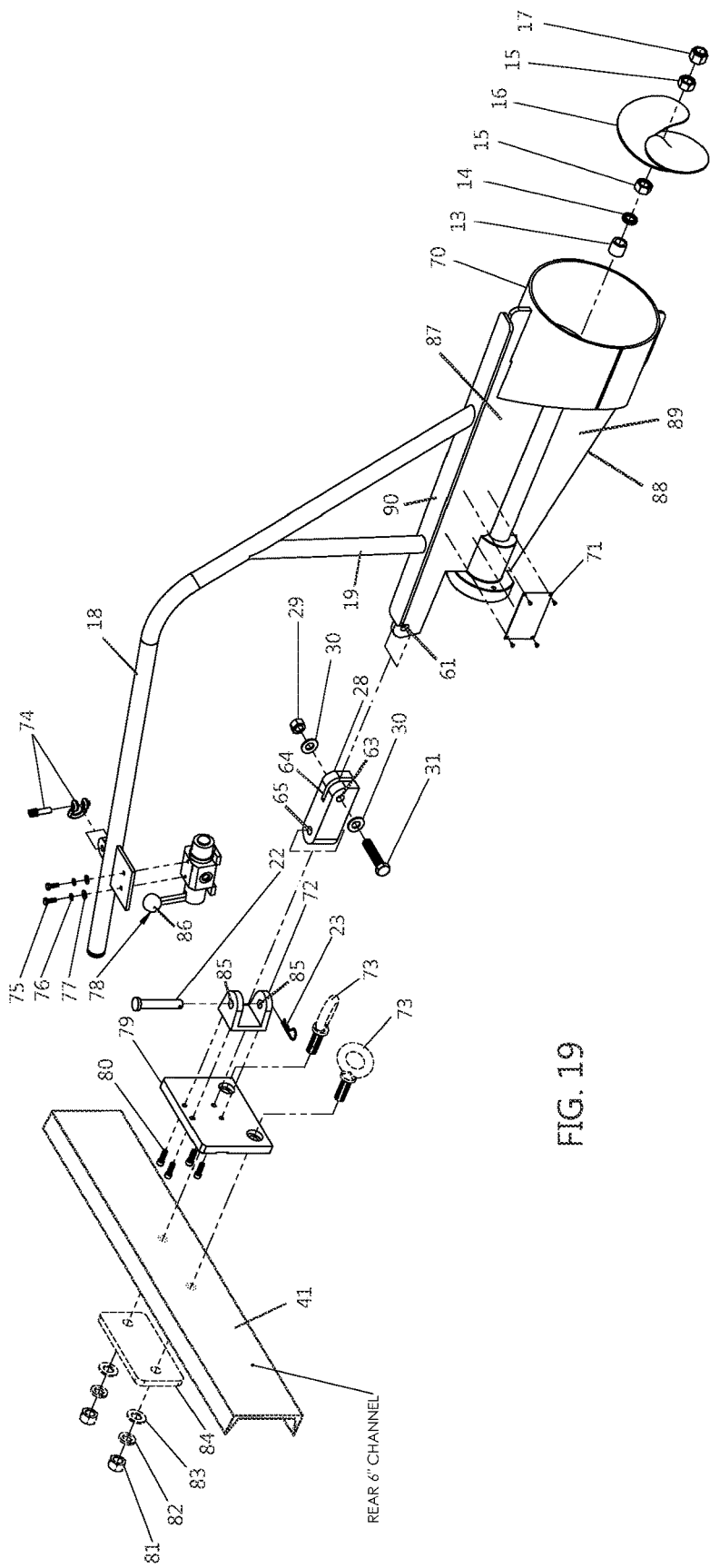
FIG. 19 is a partial perspective exploded view of an alternate embodiment of the apparatus of the present invention.

FIGS. 18 and 19 show an alternate embodiment that employs prop drive weldment/ring 70. Weldment/ring 70 can be connected to prop drive housing weldment 88. Prop drive housing weldment 88 (which can include upper skeg 87 and lower skeg 89) is shown in FIGS. 18, 19. The skegs 87, 89 interface with sleeve 34 and motor mount 35. The weldment or assembly 88 of sleeve 34, skegs 87, 89, horizontal plate 90 and motor mount 35 can be of welded steel or welded aluminum construction or it can be a casting.

Prop drive weldment/ring 70 connects to prop drive housing weldment 88 at upper skeg 87 and lower skeg 89. The weldment or assembly of skegs 87, 89 and prop drive weldment/ring 70 can be of welded steel or welded aluminum construction or it can be a casting. Alternatively, components that form the connection between shaft 11 and propeller 16, including plain bearing 13, shaft seal 14, nuts 15 and nut 17 (see FIG. 19), can be used to secure or hold prop drive weldment/ring 70 to prop drive housing weldment 88.

FIG. 19 illustrates in more detail an alternate universal joint or attachment 42 that preferably connects between plate 87 at opening 61 and transom 41. Mounting plate 79 attaches to transom 41 by forming a connection with plate 84. Nuts 81, lock washers 82, and flat washers 83 attach to eyebolts 73 to connect plate 84, transom 41, and plate 79 together.

Prop drive mounting channel 72 attaches to plate 79. Bolted connections including bolts 80 can be used to affix mounting channel 72 to plate 79. Prop drive pivot pin 22 forms a connection between prop drive mounting channel 72 and pivot block/swivel link 28, through openings 85 of mounting channel 72 and opening 65 of pivot block/swivel link 28. A bolted connection can be used to bolt pivot block 28 to plate 87. In FIG. 19, that bolted connection includes hex bolt 31, flat washers 30 and nut 29. A pin (e.g., hairpin) or pivot pin clip can be provided at 23 for retaining pivot pin 22 in openings 85 of channel 72. During assembly, the openings 61, 63 are aligned when plate 87 is placed into slot 64.

In FIGS. 18 and 19, prop drive control valve 78 can be mounted on arm 18 using bolts 75, lock washer 76, and flat washers 77. The control valve 78 can include an actuator 86 that can be moved between forward and backward positions as well as a neutral position. In FIG. 18, drive assembly DA provides one or more hydraulic hoses 39 that interface between motor 4 and control valve 78. Hoses 39 also form an interface with the hydraulic power unit 60.

Drive assembly DA can include a prop drive name tag 71 secured to prop drive housing weldment 88.

The following is a list of parts and materials suitable for use in the present invention:

PARTS LIST

| PART NUMBER | DESCRIPTION |
| --- | --- |
| DA | drive assembly |
| 1 | hex bolt |
| 2 | lock washer |
| 3 | flat washer |
| 4 | motor |
| 5 | O-ring |
| 6 | splined bushing |
| 7 | snap ring |
| 8 | nut |
| 9 | lock washer |
| 10 | ball bearing |
| 11 | prop drive shaft |
| 12 | prop drive housing weldment/assembly |
| 13 | plain bearing |
| 14 | shaft seal |
| 15 | nut |
| 16 | propeller |
| 17 | nut |
| 18 | arm |
| 19 | strut |
| 20 | plate/cavitation plate |
| 21 | pivot mount plate |
| 22 | prop drive pivot pin |
| 23 | hairpin for pivot pin/clip |
| 24 | prop drive pivot channel |
| 25 | flat washer |
| 26 | lock washer |
| 27 | hex bolt |
| 28 | pivot block/swivel link |
| 29 | nut |

-continued

| PART NUMBER | DESCRIPTION |
| --- | --- |
| 30 | washer |
| 31 | hex bolt |
| 32 | horizontal plate |
| 33 | vertical plate/skeg/weldment |
| 34 | sleeve |
| 35 | motor mount |
| 36 | cavity |
| 37 | control valve |
| 38 | actuator |
| 39 | hose |
| 40 | bottom panel/horizontal surface/underside |
| 41 | transom |
| 42 | universal joint/attachment |
| 43 | reference line |
| 44 | actuator |
| 45 | actuator |
| 46 | support |
| 47 | attachment |
| 48 | attachment |
| 49 | arrow |
| 50 | amphibious tracked vehicle |
| 51 | frame/platform structure |
| 52 | pontoon, port |
| 53 | pontoon, starboard |
| 54 | bogie wheel |
| 55 | track/endless track |
| 56 | cleat |
| 57 | port hydraulic motor drive |
| 58 | starboard motor drive |
| 59 | cabin/control station |
| 60 | hydraulic power unit |
| 61 | opening |
| 62 | opening |
| 63 | opening |
| 64 | slot |
| 65 | opening |
| 66 | vertical plate/skeg |
| 67 | attachment |
| 70 | prop drive weldment/cover |
| 71 | prop drive name tag |
| 72 | prop drive mounting channel |
| 73 | eyebolt |
| 74 | shackle |
| 75 | bolt |
| 76 | lock washer |
| 77 | flat washer |
| 78 | prop drive control valve |
| 79 | mounting plate |
| 80 | bolt |
| 81 | nut |
| 82 | lock washer |
| 83 | flat washer |
| 84 | plate |
| 85 | opening |
| 86 | actuator |
| 87 | vertical plate/skeg/weldment |
| 88 | prop drive housing weldment |
| 89 | vertical plate/skeg/weldment |
| 90 | horizontal plate |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A tracked, amphibious vehicle, comprising:
   a) at least two, spaced, elongated pontoons disposed generally parallel to one another in left and right positions;
   b) a platform structure supported by and structurally connecting the pontoons, the platform structure including a transom, a lowermost generally horizontally extending panel above a free clearance area under a bottom panel and between the pontoons through which terrain and debris can pass;
   c) a hydraulic drive system that propels the vehicle, said drive system including left and right hydraulic motors mounted on the pontoons, the left hydraulic motor mounted on the left pontoon, the right hydraulic motor mounted on the right pontoon;
   d) at least one series of longitudinally spaced bogie wheels for supporting said vehicle mounted along a bottom of each of said pontoons;
   e) a continuous, endless belt encircling each pontoon and engaging the bogie wheels;
   f) ground-engaging cleats assembled on an outer surface of each belt and covering the pontoon bottom for providing traction to the vehicle;
   g) wherein each of the left and right hydraulic motors interfaces with the endless belts; and
   h) a supplemental, marine drive assembly that includes:
      a marine drive assembly hydraulic motor having a rotary device, shaft, with an axis;
      a propeller shaft having an axis;
      wherein the marine drive assembly hydraulic motor axis and propeller shaft axis are aligned;
      a universal joint that connects the marine drive assembly hydraulic motor to the platform structure;
      wherein the universal joint includes an attachment that is on the platform structure;
      a housing including a sleeve that contains the propeller shaft, a first plate connected to the sleeve and a second plate connected to the sleeve below the first plate.

2. The vehicle of claim 1 wherein said first and second plates define a plane.

3. The vehicle of claim 1 wherein the propeller is movable between a lower position below said horizontally extending panel and an upper position above said horizontally extending panel.

4. The vehicle of claim 1 wherein said sleeve is movable between a lower position below said horizontally extending panel and an upper position above said horizontally extending panel.

5. The vehicle of claim 1 further comprising a horizontal plate attached to said first plate.

6. The vehicle of claim 5 further comprising a cavitation plate attached to the first plate and the horizontal plate.

7. The vehicle of claim 6 further comprising an arm connected to the housing at the horizontal plate.

8. The vehicle of claim 7 wherein the arm attaches to the horizontal plate at a first position and to the housing at a second position that is behind the first position.

9. The vehicle of claim 1 further comprising an actuator that lifts and lowers the propeller and sleeve.

10. The vehicle of claim 1 further comprising an actuator that pivots the sleeve and propeller between port and starboard positions.

11. A tracked, amphibious vehicle, comprising:
   a) at least two, spaced, elongated pontoons disposed generally parallel to one another in left and right positions;
   b) a platform structure supported by and structurally connecting the pontoons, the platform structure including a transom, a lowermost generally horizontally extending panel above a free clearance area under a bottom panel and between the pontoons through which terrain and debris can pass;

c) a hydraulic drive system that propels the vehicle, said drive system including left and right hydraulic motors mounted on the pontoons, the left hydraulic motor mounted on the left pontoon, the right hydraulic motor mounted on the right pontoon;

d) at least one series of longitudinally spaced bogie wheels for supporting said vehicle mounted along a bottom of each of said pontoons;

e) a continuous, endless belt encircling each pontoon driven by the hydraulic drive system and engaging the bogie wheels;

f) ground-engaging cleats assembled on an outer surface of each belt and covering the pontoon bottom for providing traction to the vehicle;

g) wherein each of the left and right hydraulic motors interfaces with the endless belts; and h) a supplemental, marine drive assembly that includes:
a marine drive assembly hydraulic motor having a rotary device, shaft, with an axis;
a propeller shaft having an axis;
wherein the marine drive assembly hydraulic motor axis and propeller shaft axis are aligned;
a universal joint that connects the marine drive assembly hydraulic motor to the platform structure;
wherein the universal joint includes an attachment that is on the platform structure;
a housing including a sleeve that contains the propeller shaft, a first plate connected to the sleeve and a second plate connected to the sleeve below the first plate.

12. The vehicle of claim 11 wherein said first and second plates define a plane.

13. The vehicle of claim 11 wherein the propeller is movable between a lower position and an upper position above said lower position.

14. The vehicle of claim 11 wherein said sleeve is movable between a lower position below said horizontally extending panel and an upper position above said horizontally extending panel.

15. The vehicle of claim 11 further comprising a horizontal plate attached to said first plate.

16. The vehicle of claim 15 further comprising a cavitation plate attached to the first plate and the horizontal plate.

17. The vehicle of claim 16 further comprising an arm connected to the housing at the horizontal plate.

18. The vehicle of claim 17 wherein the arm attaches to the horizontal plate at a first position and to the housing at a second position that is behind the first position.

19. The vehicle of claim 11 further comprising an actuator that lifts and lowers the propeller and sleeve.

20. The vehicle of claim 11 further comprising an actuator that pivots the sleeve and propeller between port and starboard positions.

21. A tracked, amphibious vehicle, comprising:

a) at least two, spaced, elongated pontoons disposed generally parallel to one another in left and right positions;

b) a platform structure supported by and structurally connecting the pontoons, the platform structure including a transom, a lowermost generally horizontally extending panel above a free clearance area under a bottom panel and between the pontoons through which terrain and debris can pass;

c) a hydraulic drive system that propels the vehicle, said drive system including left and right hydraulic motors mounted on the pontoons, the left hydraulic motor mounted on the left pontoon, the right hydraulic motor mounted on the right pontoon;

d) at least one series of longitudinally spaced bogie wheels for supporting said vehicle mounted along a bottom of each of said pontoons;

e) a continuous, endless belt encircling each pontoon and engaging the bogie wheels;

f) ground-engaging cleats assembled on an outer surface of each belt and covering the pontoon bottom for providing traction to the vehicle;

g) wherein each of the left and right hydraulic motors interfaces with a said endless belt; and h) a supplemental, marine drive assembly that includes:
a marine drive assembly hydraulic motor having a rotary device, shaft, with an axis;
a propeller shaft having an axis;
wherein the marine drive assembly hydraulic motor axis and propeller shaft axis are aligned;
a joint that connects the marine drive assembly hydraulic motor to the platform structure;
wherein the joint includes an attachment that is on the platform structure;
a first actuator connected at a first end portion to the platform and at a second end portion connected to the supplemental, marine drive system, wherein said first actuator is positioned to lift and lower the propeller shaft;
a second actuator having a first end portion connected to the platform and a second end portion connected to the supplemental drive system, wherein said second actuator is positioned to steer said propeller shaft between port and starboard positions.

22. The vehicle of claim 21 wherein the propeller is movable between a lower position below said horizontally extending panel and an upper position above said horizontally extending panel.

23. The vehicle of claim 21 wherein the first actuator is a hydraulic cylinder.

24. The vehicle of claim 21 wherein the second actuator is a hydraulic cylinder.

25. The vehicle of claim 21 further comprising controls on the platform that enable a user to remotely lift, lower or steer the propeller shaft.

* * * * *